United States Patent
Lin

(10) Patent No.: US 9,160,575 B1
(45) Date of Patent: Oct. 13, 2015

(54) DISCRETE-TIME LINEAR EQUALIZER AND METHOD THEREOF

(71) Applicant: REALTEK SEMICONDUCTOR CORPORATION, Hsinchu (TW)

(72) Inventor: Chia-Liang Leon Lin, Fremont, CA (US)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/495,234

(22) Filed: Sep. 24, 2014

(51) Int. Cl.
*H04L 25/03* (2006.01)
*H03H 7/30* (2006.01)
*H03H 7/40* (2006.01)

(52) U.S. Cl.
CPC .... *H04L 25/03019* (2013.01); *H04L 25/03885* (2013.01)

(58) Field of Classification Search
CPC .................. H04L 25/03038; H04L 25/03057; H04L 25/03885; H04L 25/03133; H04L 25/03019
See application file for complete search history.

(56) References Cited

U.S. PATENT DOCUMENTS

| 6,148,044 A * | 11/2000 | Ono et al. ............ 375/343 |
| 6,727,749 B1 * | 4/2004 | Quinn ............... 330/9 |
| 2008/0048901 A1 * | 2/2008 | Cormier .............. 341/155 |

OTHER PUBLICATIONS

Wo 2009104129, Aug. 27, 2009, Briaire Joseph.*

* cited by examiner

*Primary Examiner* — Ted Wang
(74) *Attorney, Agent, or Firm* — Sughrue Mion, PLLC

(57) ABSTRACT

An equalizer and equalizing method are disclosed. The equalizer comprises a first switch sampling an input signal into a first sampled signal at a first phase of a clock; a first buffer receiving the first sampled signal and outputting a held signal; a second switch sampling the held signal into a second sampled signal at a second phase of the clock; a second buffer receiving the second sampled signal and outputting an output signal; and a capacitor providing a capacitive coupling between the held signal and the output signal. The capacitor is configured to define a transfer function of the equalizer.

15 Claims, 3 Drawing Sheets

DISCRETE-TIME LINEAR EQUALIZER AND METHOD THEREOF

BACKGROUND OF THE INVENTION

1. Field of the Invention

The present invention generally relates to a linear equalizer.

2. Description of Related Art

A linear equalizer receives an input signal and outputs an output signal, wherein a first frequency component of the input signal is suppressed while a second frequency component of the input signal is enhanced. Usually, a lower frequency component is suppressed while a higher frequency component is enhanced. This effectively corrects a frequency dispersion of the input signal that often exists in many practical applications. A linear equalizer can be embodied using a FIR (finite impulse response) filter. In U.S. Pat. No. 8,255,449, Lin et al taught a continuous-time FIR filter that can be used as a linear equalizer. A drawback of the continuous-time FIR filter is that the overall circuit speed is reduced when the order of the filter is increased. This limits the order of the filter that can be practically implemented. The same drawback applies to any type of continuous-time filter.

What is desired is a linear equalizer that allows an increase of an order of filtering without materially reducing the overall circuit bandwidth.

BRIEF SUMMARY OF THE INVENTION

The present invention equalizes a signal using a discrete-time sampling method along with a capacitive coupling.

The present invention allows a plurality of first order equalizers to be cascaded to form a high order equalizer without materially sacrificing an overall circuit speed.

In an exemplary embodiment, an equalizer comprises: a first switch sampling an input signal into a first sampled signal at a first phase of a clock; a first buffer receiving the first sampled signal and outputting a held signal; a second switch sampling the held signal into a second sampled signal at a second phase of the clock; a second buffer receiving the second sampled signal and outputting an output signal; and a capacitor providing a capacitive coupling between the held signal and the output signal. The capacitor is configured to define a transfer function of the equalizer.

In an exemplary embodiment, an equalizer comprises a plurality of S/H (sample-and-hold) circuits configured in a cascade topology, receiving an input signal and outputting a plurality of held signals and a plurality of output signals, and a capacitive coupling matrix providing a capacitive coupling among said held signals and said output signals. The capacitive coupling matrix is configured to define a transfer function of the equalizer.

In an exemplary embodiment, a method comprises: sampling an input signal at a first phase of a clock to generate a first sampled signal; buffering the first sampled signal to generate a held signal; sampling the held signal at a second phase of the clock to generate a second sampled signal; buffering the second sampled signal to generate an output signal; and providing a capacitive coupling between the held signal and the output signal.

DETAILED DESCRIPTION OF THE INVENTION

The present invention relates to a linear equalizer. While the specification describes several exemplary embodiments of the invention considered as favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of the invention.

Throughout this disclosure, a differential signaling is used, wherein a signal is a voltage comprising a first end denoted by a subscript "+" and a second end denoted by a subscript "−" and the signal is defined as a voltage of the first end minus a voltage of the second end. For instance, a signal $V_I$ comprises a first end $V_{I+}$ and a second end $V_{I-}$ and the signal $V_I$ is equal to $V_{I+} - V_{I-}$. For brevity, we simply refer to $V_I$, but it would be understood that when referring to a differential voltage $V_I$, both $V_{I+}$ and $V_{I-}$ are involved. In addition, a schematic diagram of a differential circuit is sometimes depicted in a single-end topology for brevity, which is a common practice and well understood to those of ordinary skill in the art without causing confusion.

Figure 1:
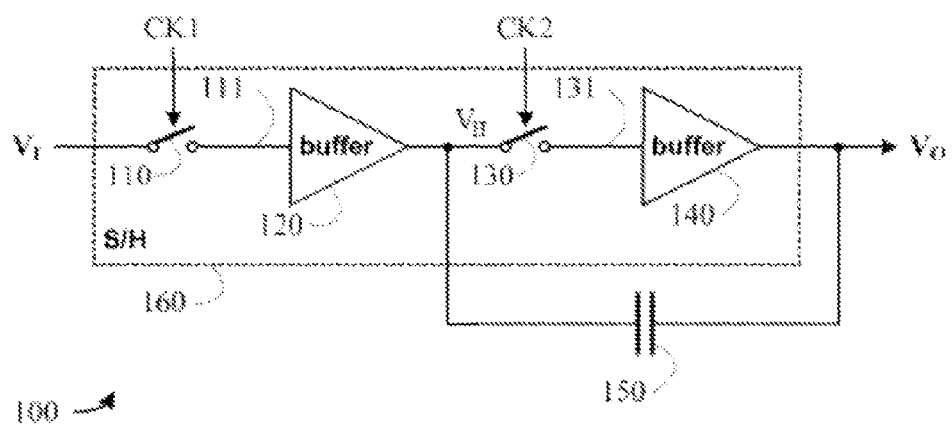
FIG. 1 shows a linear equalizer in accordance with an embodiment of the present invention.

A schematic diagram of a linear equalizer 100 in accordance with an embodiment of the present invention is shown in FIG. 1. Linear equalizer 100 comprises a S/H (sample and hold) circuit 160 receiving an input signal $V_I$ and outputting a held signal $V_H$ and an output signal $V_O$. A capacitor 150 provides a capacitive coupling between the held signal $V_H$ and the output signal $V_O$. The S/H circuit 160 includes: a first switch 110 for sampling the input signal $V_I$ into a first sampled signal 111 in accordance with a first clock CK1. A first buffer 120 receives the first sampled signal 111 and outputs the held signal $V_H$. A second switch 130 samples the held signal $V_H$ in accordance with a second clock CK2 to provide a second sampled signal 131. CK2 is complementary (e.g. a logical inversion) to the first clock CK1. A second buffer 140 receives the second sampled signal 131 and outputs the output signal $V_O$. The held signal $V_H$ is a sample of the input signal $V_I$ with a scaling factor determined by a gain of the first buffer 120. The second sampled signal 131 is a sample of the held signal $V_H$. The capacitor 150 provides an AC (alternating current) coupling between the held signal $V_H$ and the output signal $V_O$, effectively superimposing a derivative of the held signal $V_H$ onto the output signal $V_O$. Therefore, the output signal $V_O$ is a sum of the input signal $V_I$ (with a first scaling factor determined by the gain of the first buffer 120 times the gain of the second buffer 140) and a derivative of the input signal $V_I$ (with a second scaling factor determined by the gain of the first buffer 120 and a value of the capacitor 150). Mathematically, a transfer function of the linear equalizer 100 can be represented in z-transform by the following equation $$V_O(z) = g_1 V_I(z) z^{-1} + g_2 [1 - z^{-1}] V_I(z) \qquad (1)$$

Here, $g_1$ is approximately determined by the gain of the first buffer 120 and the gain of the second buffer 140, and $g_2$ is a factor approximately determined by the gain of the first buffer 120 and a value of the capacitor 150. Equation (1) is a transfer function of a first order linear equalizer. A greater value of the capacitor 150 leads to a greater value of $g_2$ and thus a greater contribution of the derivative term. As a result, there is a greater emphasis on a high frequency component of the signal to be processed.

A distinct advantage of linear equalizer 100 over a continuous-time filter is that linear equalizer 100 can be cascaded to form a high order linear equalizer without materially sacrificing the overall circuit speed. This is because linear equalizer 100 is a discrete-time circuit, wherein samples are taken and processed in the discrete-time domain, and the overall circuit speed is maintained as long as the samples settle. That is, as long as the buffers (e.g. 120 and 140) and switches (e.g. 110 and 130) are fast enough so that the samples (111 and 131) can adequately settle before the clocks (e.g. CK1 and CK2) toggle, there is no fundamental limit on the number of the same linear equalizer circuits that can be cascaded. Note that CK1 and CK2 are complementary and they together form a two-phase clock. CK1 is a first phase of the two-phase clock, while CK2 is a second phase of the two-phase clock.

Figure 2:
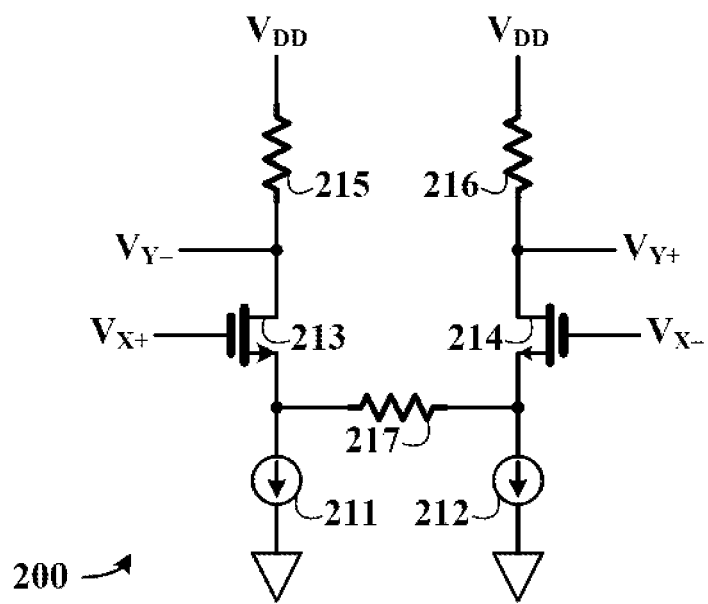
FIG. 2 shows an embodiment of a buffer.

A schematic diagram of a buffer 200 suitable for embodying buffers 120 and 140 of FIG. 1 is depicted in FIG. 2. Buffer 200 receives an input signal $V_X$ (which is the first sampled signal 111 when buffer 200 is used to embody buffer 120 of FIG. 1) and outputs an output signal $V_Y$ (which is the held signal $V_H$ when buffer 200 is used to embody buffer 120 of FIG. 1). Buffer 200 comprises: current sources 211 and 212, NMOS (n-channel metal oxide semiconductor) transistors 213 and 214, load resistors 215 and 216, and a source degeneration resistor 217, which is a CML (current-mode logic) circuit. Switches 110 and 130 of FIG. 1 can be embodied by circuits, for instance, using a NMOS transistor. Buffers 120 and 140, and switches 110 and 130 can be embodied by any circuits that can fulfill the respective "buffering" and "sampling" functions, as long as the resultant sampled signals can adequately settle, as far as a discrete-time signal processing is concerned.

Figure 3:
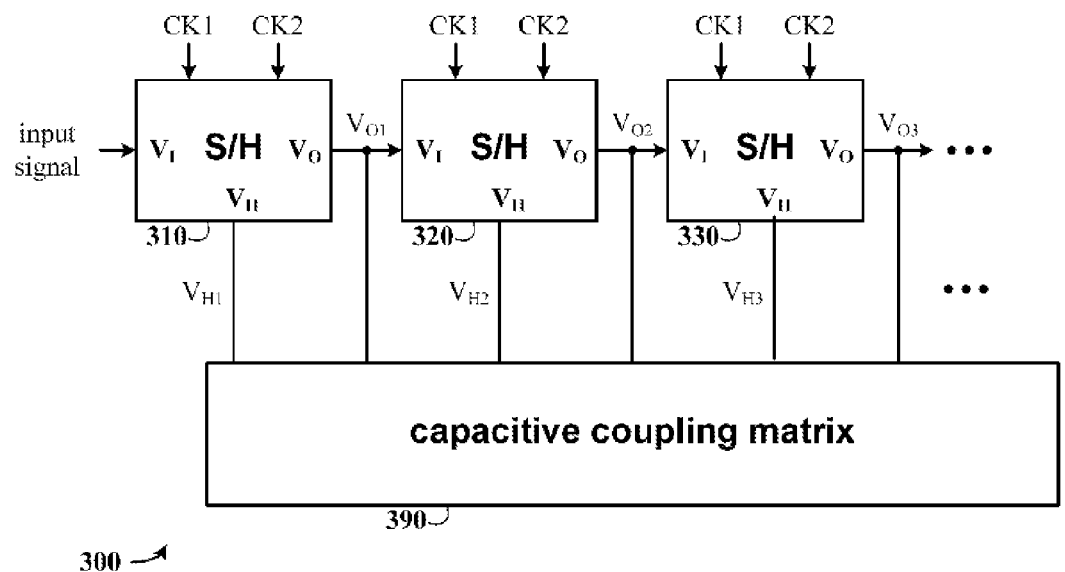
FIG. 3 shows a general linear equalizer in accordance with another embodiment of the present invention.

As depicted in FIG. 3, a general linear equalizer 300 in accordance with the present invention comprises a plurality of S/H circuits 310, 320, 330 . . . configured in a cascade topology. Each S/H circuit receives a respective input signal, with each downstream S/H circuit receiving as an input signal, the output signal of the preceding S/H circuit. Each S/H circuit outputs a held signal and outputs an output signal, thereby providing a plurality of held signals $V_{H1}$, $V_{H2}$, $V_{H3}$ . . . and a plurality of output signal $V_{O1}$, $V_{O2}$. $V_{O3}$ . . . . A capacitive coupling matrix 390 provides a capacitive coupling among said held signals $V_{H1}$, $V_{H2}$, $V_{H3}$ . . . , and said output signals $V_{O1}$, $V_O$, $V_{O3}$ . . . . The capacitive coupling matrix 390 defines a transfer function of the general linear equalizer 300. S/H circuits 310, 320, 330 . . . can be embodied by S/H circuit 160 of FIG. 1. Also, note that capacitor 150 of FIG. 1 is a simple example of the capacitive coupling matrix 390 of FIG. 3.

Those skilled in the art will readily observe that numerous modifications and alterations of the device and method may be made while retaining the teachings of the invention. Accordingly, the invention should not be limited by the exemplary embodiments, but described by the appended claims and equivalents thereof.

What is claimed is:

1. An equalizer comprising:
   a first switch sampling an input signal at a first phase of a clock to output a first sampled signal;
   a first buffer receiving the first sampled signal and outputting a held signal;
   a second switch sampling the held signal at a second phase of the clock to output a second sampled signal;
   a second buffer receiving the second sampled signal and outputting an output signal; and
   a capacitor providing a capacitive coupling between the held signal and the output signal.

2. The equalizer of claim 1, wherein a value of the capacitor is configured to define a transfer function of the circuit.

3. The equalizer of claim 2, wherein the first buffer comprises a CML (current-mode logic) circuit.

4. The equalizer of claim 3, wherein the second buffer comprise a CML circuit.

5. The equalizer of claim 1, wherein the capacitor providing capacitive coupling directly couples the held signal which is output from the first buffer and the output signal which is output by the second buffer.

6. An equalizer comprising:
   a plurality of S/H (sample-and-hold) circuits configured in a cascade topology receiving an input signal and outputting a plurality of held signals and further outputting a plurality of output signals; and
   a capacitive coupling matrix providing a capacitive coupling among said plurality of held signals and said plurality of output signals.

7. The equalizer of claim 6, wherein the capacitive coupling matrix is configured to define a transfer function of the equalizer.

8. The equalizer of claim 7, wherein each of said S/H circuits comprises:
   a first switch sampling a signal output from a preceding S/H circuit into a first sampled signal at a first phase of a clock;
   a first buffer receiving the first sampled signal and outputting a held signal;
   a second switch sampling the held signal into a second sampled signal at a second phase of the clock; and
   a second buffer receiving the second sampled signal and outputting an output signal.

9. The equalizer of claim 8, wherein the first buffer comprises a CML (current-mode logic) circuit.

10. The equalizer of claim 9, wherein the second buffer comprise a CML circuit.

11. The equalizer of claim 6, wherein the plurality of S/H circuits configured in cascade comprise at least a first S/H circuit and a second S/H circuit, wherein the first S/H circuit receives the input signal and outputs a first held signal and further outputs a first output signal, and said second S/H circuit receives the first output signal as input and outputs a second held signal and a second output signal, wherein the plurality of held signals includes said first and second held signals and wherein the plurality of output signals includes said first and second output signal.

12. The equalizer of claim 6, wherein the capacitive coupling matrix provides direct capacitive coupling between the plurality of held signals and the plurality of output signals.

13. A equalizing method comprising:
   sampling an input signal at a first phase of a clock to generate a first sampled signal;
   buffering the first sampled signal to generate a held signal;
   sampling the held signal at a second phase of the clock to generate a second sampled signal;
   buffering the second sampled signal to generate an output signal; and
   providing a capacitive coupling between the held signal and the output signal.

14. The equalizing of claim 13 further comprising: configuring a strength of the capacitive coupling to define a transfer function between the input signal and the output signal.

15. The method of claim 13, wherein the capacitive coupling provides direct capacitive coupling between the held signal and the output signal.

\* \* \* \* \*